Nov. 6, 1934.          W. S. SHIELDS           1,979,647
                    HANDLING SEWAGE SLUDGE
                 Filed July 30, 1931    2 Sheets-Sheet 1
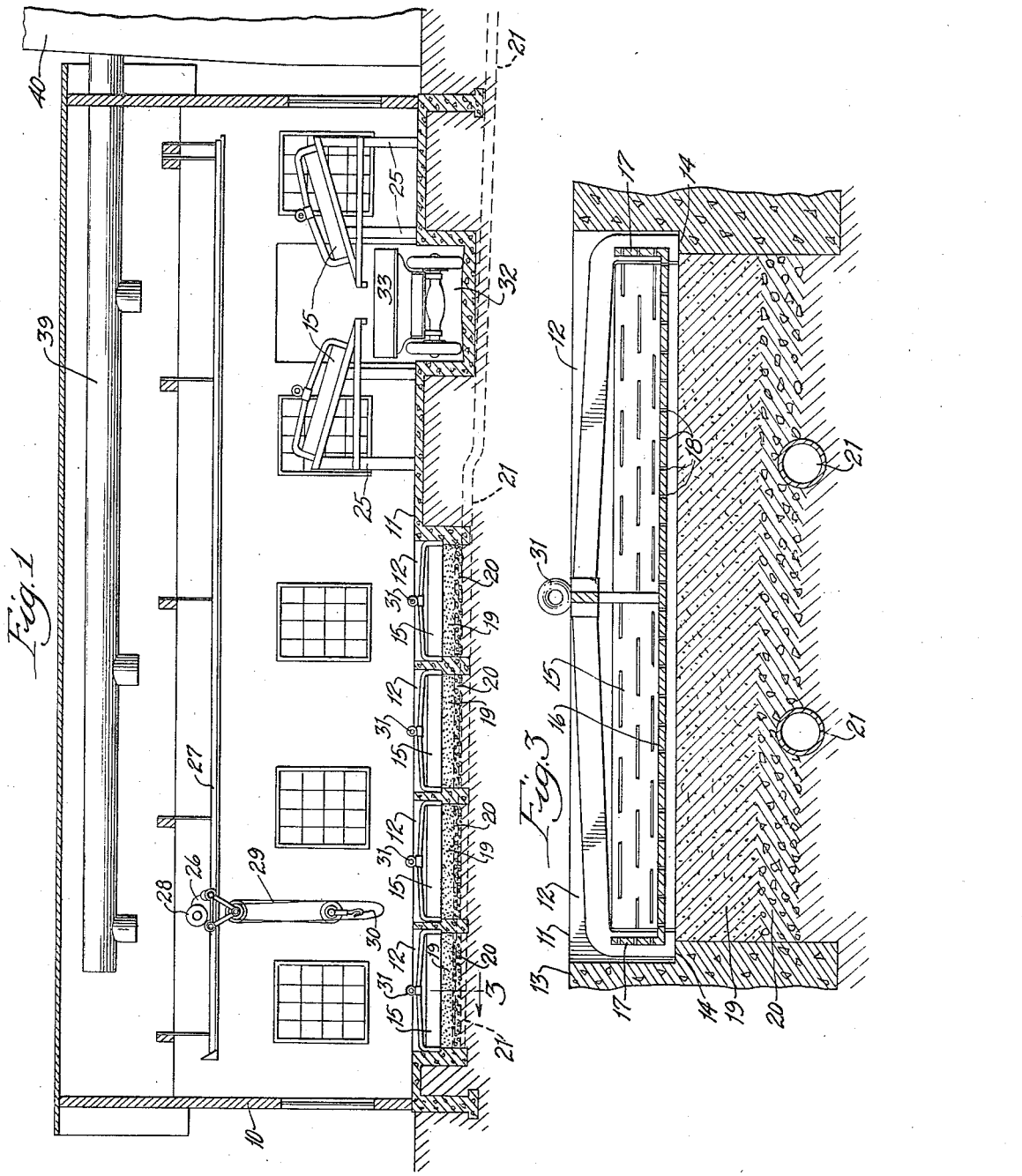
Inventor:
William S. Shields,
By Banning & Banning
Attys

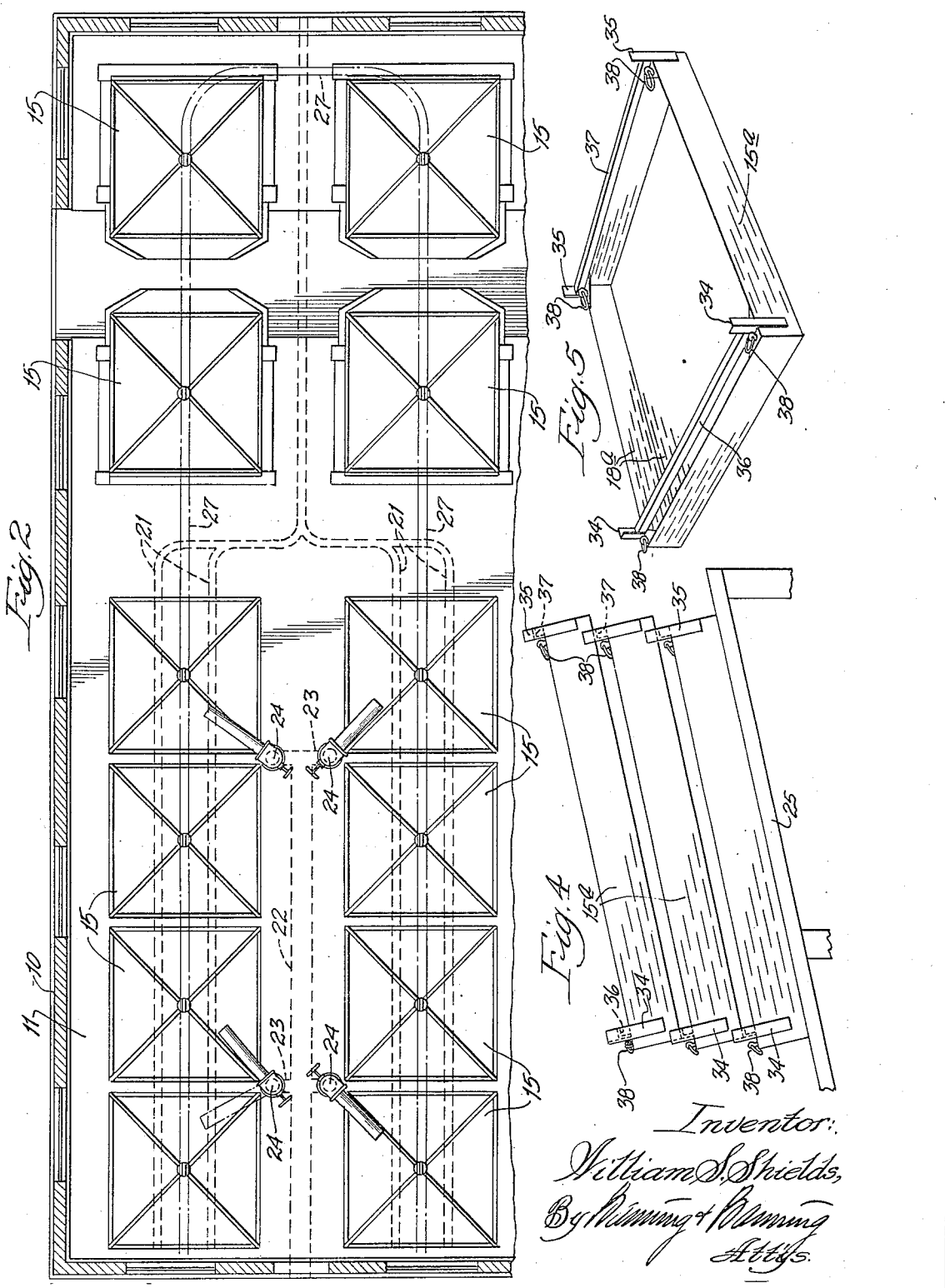

Patented Nov. 6, 1934

1,979,647

UNITED STATES PATENT OFFICE 1,979,647

HANDLING SEWAGE SLUDGE

William S. Shields, Evanston, Ill.

Application July 30, 1931, Serial No. 554,062

1 Claim. (Cl. 210—62)

In modern sewage treatment works the sewage is treated by one of several different processes to separate the matter held in suspension from the water. The matter thus separated is termed sludge, and the treated water known as effluent is discharged into some convenient natural water course. This sludge, when separated, is given additional treatment, which decreases its bulk, by bacterial action liberating gases, and by a process known to the profession as digestion, changes the organic matter leaving a final sludge in such condition that further putrefaction or odor producing conditions will not occur.

The sludge thus treated must be disposed of and the usual method is to discharge it upon areas of specially prepared drying beds, consisting of some eighteen inches of sand and gravel underdrained with tile and surrounded with concrete or other suitable curbs, the present practice being to provide from three-fourths to one square foot of drainage area per capita served. These drying beds, when covered with some nine inches of sludge, are allowed to stand undisturbed until the water contained in the sludge has drained through the sand and the remaining moisture is removed by evaporation, requiring a period of time ranging from six to twelve weeks, dependent upon the nature of the sludge and weather conditions, or until it is sufficiently dry to be removed from the sand bed by workmen using forks or shovels, who throw it into trucks or tram cars to be transferred to some convenient dump.

An object of this invention is to provide for use in the handling, draining and drying of sewage sludge, certain appliances, means and methods for handling it which will materially reduce the area of drainage beds, the time required to dry, the labor of handling and the improvement of working conditions, all of which is fully described in the following specification and shown in the accompanying drawings, in which—

Figure 1 is a vertical section through a sludge drying plant embodying the invention;

Fig. 2 is a plan view of the same;

Fig. 3 is an enlarged vertical section through one of the sludge trays as placed in the draining operation, the section being taken on the line 3 of Fig. 1;

Fig. 4 is a side elevation of a modified form of the trays adapted to be stacked upon drying racks; and Fig. 5 is a perspective view of one of the trays of Fig. 4.

The embodiment illustrated in Figs. 1 to 3 comprises a building 10 having a floor 11 in which are a number of depressions or drainage beds 12 which are separated by partitions 13 of concrete or the like, which have ledges 14 on which trays 15 for holding wet sludge are supported and allowed to drain. These trays have metal bottoms 16 and sides 17 which are provided with slots or openings 18 of any desired shape, size and number.

These trays lie over a bed of sand 19 under which is placed a layer of gravel 20 in which is placed lines of drain tile 21 for carrying off the water which drains from the sludge in the trays. If desired, the sand 19 may act also as a support for the trays. A series of these trays are arranged in rows, as shown at the left hand end of Fig. 2, and are filled with sludge which is brought in through a pipe 22 and branch pipes 23, each of which is controlled by means of a suitable valve 24. Various piping arrangements may be used for filling these trays, the one shown being illustrative only.

After the trays have been filled to a determined depth with wet sludge they are allowed to remain over the draining beds until the drainable water has drained therefrom, requiring from ten to twenty-four hours of time, the trays are then lifted by some suitable or convenient mechanical hoist 29 having hook 30 adapted to engage a lifting ring 31 in each of the trays 15 and be transported to one of the racks 25. When a tray has been removed from the drainage bed, the bed may be restored and receive new trays and again be ready for use within two days.

The racks 25 are preferably tilted so as to slope the trays toward the center space 32 in which is provided a roadway for trunks, dump cars, or the like, for carrying off the dried sludge. When dried, a truck 33 may be brought into position in front of the tray so that an operator can rake the dried sludge from the tray into the truck. If desired, the near side of the tray may be made hinged so as to facilitate raking the sludge therefrom.

In Figs. 4 and 5 is shown a modified form of tray $15^a$ which permits them to be piled one above the other so as to more effectually utilize the drying space. This tray has perforated or slotted openings $18^a$ in the bottom and sides. The strips 34 and 35 are secured to the sides, and these carry cross angle members 36 and 37, or the like, upon which may rest the next higher tray. These trays are provided with rings 38, or the like, in the corners of which are adapted to receive suitable hooks on the ends of chains (not shown) by which the tray may be readily transported by means of the hoist 29.

A number of these trays will thus be piled one above the other, preferably at the same time, and left to dry, so that they will all finish the drying operation at substantially the same time. When dry the sludge from the topmost tray is then raked into the truck, after which this tray may be removed. The next tray is then emptied in the same manner and the tray removed until the bottom of the pile is reached, after which the rack is then ready to receive a new series of trays to be dried.

Thus it will be seen that a very simple and effective means is provided for the draining, drying and handling of the sludge, and on which requires but a small fraction of the drainage areas and the time required and the amount of disagreeable handling, and the attending costs necessary in the methods now in common use.

A vent pipe 39 leading to a suitable stack 40 serves to remove moisture and odors from the drying room.

While I have shown and described but a few embodiments of my invention, it is to be understood that it is capable of many modifications. Changes, therefore, in the construction and arrangement may be made which do not depart from the spirit and scope of the invention as disclosed in the appended claim.

I claim:

Apparatus for handling sewage sludge comprising a series of shallow perforate trays adapted to receive the wet sludge, a water permeable support for said trays while draining, drying racks adapted to hold said trays so as to permit air to reach them from all sides, means for carrying the trays from the draining supports to the drying racks, and a conveyance adapted to be placed below the racks, said racks being inclined toward the conveyance so as to be readily emptied thereinto.

WILLIAM S. SHIELDS.